(No Model.)
J. O. BOGGS.
LEVELING ATTACHMENT FOR MEASURING FAUCETS.
No. 355,127. Patented Dec. 28, 1886.
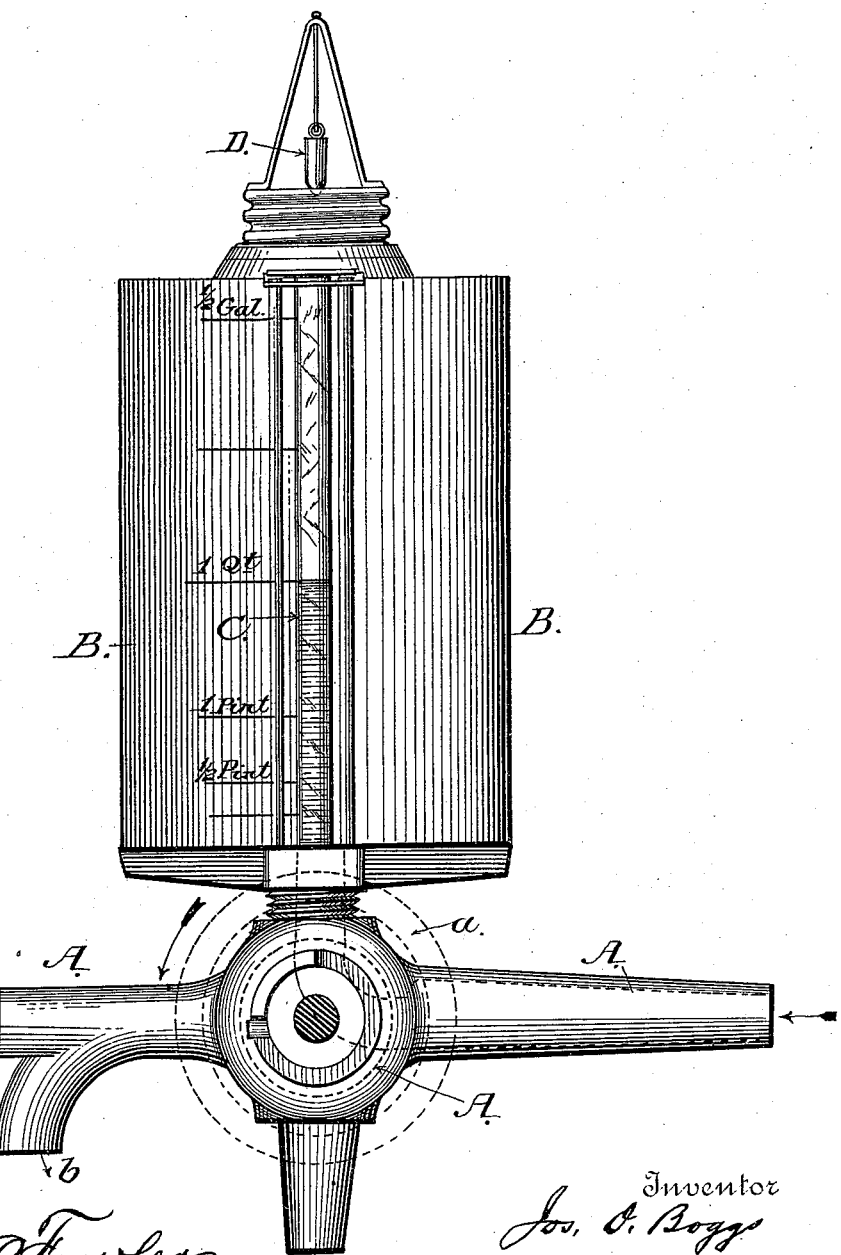

UNITED STATES PATENT OFFICE.

JOSEPH O. BOGGS, OF HARRISBURG, PENNSYLVANIA, ASSIGNOR OF ONE-HALF TO S. KIRK JACOBS AND JOHN M. JACOBS, BOTH OF SAME PLACE.

LEVELING ATTACHMENT FOR MEASURING-FAUCETS.

SPECIFICATION forming part of Letters Patent No. 355,127, dated December 28, 1886.

Application filed April 7, 1886. Serial No. 198,151. (No model.)

*To all whom it may concern:*

Be it known that I, JOSEPH O. BOGGS, of Harrisburg, in the county of Dauphin and State of Pennsylvania, have invented a new and useful Improvement in Faucet Measures and Indicators, of which the following is a full, clear, and exact description, reference being had to the accompanying drawing, forming part of this specification, in which the figure represents a faucet measure and indicator with my improvements attached.

My present invention relates to that class of devices designed to combine with the common three-way faucet a measure and an indicator to show the amount of liquid drawn; and it consists in the combination of the several elements hereinafter described and claimed.

To enable others skilled in the art to make and use my invention, I will proceed to describe the exact manner in which I have carried it out.

In the drawing, A represents an ordinary three-way faucet, and B is a suitable vessel into which the liquid is drawn and measured. C is a glass tube attached to the measuring-vessel at its bottom, and in which the liquid is seen to rise correspondingly to the rise in the measure. As the side of the measure next the tube is graduated or marked to show the different measures, as half-pint, pint, quart, &c., it is evident that when the required amount of liquid has entered the measure the fact will be clearly indicated by the liquid in the glass tube. In order, however, to secure a correct measurement of the liquid, it is necessary that the vessel B be held vertical, or, in other words, that its bottom be kept exactly level, and to this end I suspend directly over the central point of the top of the vessel the plummet D, by which I am enabled to detect, instantaneously, the slightest tendency of the measuring-vessel to lean to one side, which would necessarily destroy the accuracy of the measurement.

When the measure is to be used, the handle *a* (see dotted lines) of the faucet is turned one-quarter round, so as to allow the liquid to enter the measure B. The level of the liquid in the tube C will always correspond with that in the vessel. When the desired quantity has entered, the handle is turned another quarter, which arrests the flow from the barrel and allows the liquid in the measure to flow out through the exit *b*. When it is desired to draw directly from the vessel or barrel without using the measure, another quarter-turn of the handle *a* continues the closed passage to the measure, and also closes the exit *b* and opens the exit *d*, allowing a flow of the liquid directly from the barrel.

I am aware that the three-way faucet and measure are not broadly new; nor do I claim such as my invention; and I also disclaim the use of a spirit-level, as I am aware that spirit-levels have been used on cream-measures; but,

Having thus described my invention, what I claim as new, and desire to secure by Letters Patent, is—

As an improved article of manufacture, a self-measuring faucet comprising a faucet, a receptacle or vessel for containing the liquid, a graduated tube communicating with said vessel, and a plummet loosely suspended above the center of said vessel, all constructed and arranged to operate as herein set forth.

JOSEPH O. BOGGS.

Witnesses:
HENRY LEE,
S. G. WEST.